US009896154B2

(12) United States Patent
Modolo

(10) Patent No.: US 9,896,154 B2
(45) Date of Patent: Feb. 20, 2018

(54) DEVICE AND METHOD FOR REGULATING THE ASSISTANCE POWER OF AN ELECTRIC POWER-ASSISTED BICYCLE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Ivan Modolo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 125 days.

(21) Appl. No.: 14/908,581

(22) PCT Filed: Jul. 28, 2014

(86) PCT No.: PCT/EP2014/066154
§ 371 (c)(1),
(2) Date: Jan. 29, 2016

(87) PCT Pub. No.: WO2015/014782
PCT Pub. Date: Feb. 5, 2015

(65) Prior Publication Data
US 2016/0167732 A1    Jun. 16, 2016

(30) Foreign Application Priority Data

Jul. 31, 2013   (FR) ...................................... 13 57590

(51) Int. Cl.
*B62M 6/50* (2010.01)
*B60L 15/20* (2006.01)
(Continued)

(52) U.S. Cl.
CPC ............. *B62M 6/50* (2013.01); *B60L 3/0061* (2013.01); *B60L 11/007* (2013.01);
(Continued)

(58) Field of Classification Search
CPC ........... B63H 21/21; B63H 21/20; B62M 6/50
See application file for complete search history.

(56) References Cited

U.S. PATENT DOCUMENTS

2003/0047369 A1   3/2003   Katagiri et al. ............... 180/206
2003/0062782 A1*  4/2003   Takano ............... B60L 11/1801
                                                              310/75 B
(Continued)

FOREIGN PATENT DOCUMENTS

CN         2462356 Y      11/2001
EP       1 967 446 A1      9/2008
(Continued)

*Primary Examiner* — Yonel Beaulieu
*Assistant Examiner* — Martin A Weeks
(74) *Attorney, Agent, or Firm* — Fitzpatrick, Cella, Harper & Scinto

(57) ABSTRACT

A device is provided for regulating an assistance power of a bicycle fitted with an electrical power assistance machine. The device includes a rotation-sense detector, a speed sensor, and a central electronic controller. The detector is arranged to detect a sense of rotation of pedals of the bicycle. The speed sensor is arranged to measure a speed of a wheel of the bicycle. The central electronic controller is configured to calculate a total power of the bicycle from the measured speed, and to determine a power setpoint of an electric motor from the calculated total power, the sense of rotation of the pedals, and a power assistance factor selected by a cyclist of the bicycle. A method for regulating an assistance power of an electric power-assisted bicycle also is provided.

8 Claims, 1 Drawing Sheet

(51) Int. Cl.
 *B60L 3/00* (2006.01)
 *B60L 11/00* (2006.01)
 *B60L 11/18* (2006.01)

(52) U.S. Cl.
 CPC ........... *B60L 11/1877* (2013.01); *B60L 15/20* (2013.01); *B60L 2200/12* (2013.01); *B60L 2240/12* (2013.01); *B60L 2240/421* (2013.01); *B60L 2240/423* (2013.01); *B60L 2240/80* (2013.01); *B60L 2260/44* (2013.01); *Y02T 10/645* (2013.01); *Y02T 10/7005* (2013.01); *Y02T 10/705* (2013.01); *Y02T 10/72* (2013.01); *Y02T 10/7275* (2013.01)

(56) References Cited

U.S. PATENT DOCUMENTS

| | | | | |
|---|---|---|---|---|
| 2012/0247853 | A1* | 10/2012 | Hashimoto | B62M 6/55 180/206.3 |
| 2014/0171266 | A1* | 6/2014 | Hawkins, III | A63B 24/0087 482/5 |
| 2014/0297009 | A1* | 10/2014 | Bass | G01L 3/242 700/91 |
| 2015/0336632 | A1 | 11/2015 | Olsommer et al. | B62M 6/75 |

FOREIGN PATENT DOCUMENTS

| | | |
|---|---|---|
| JP | 2011-178341 A | 9/2011 |
| KR | 10-2012-0051177 A | 5/2012 |

* cited by examiner

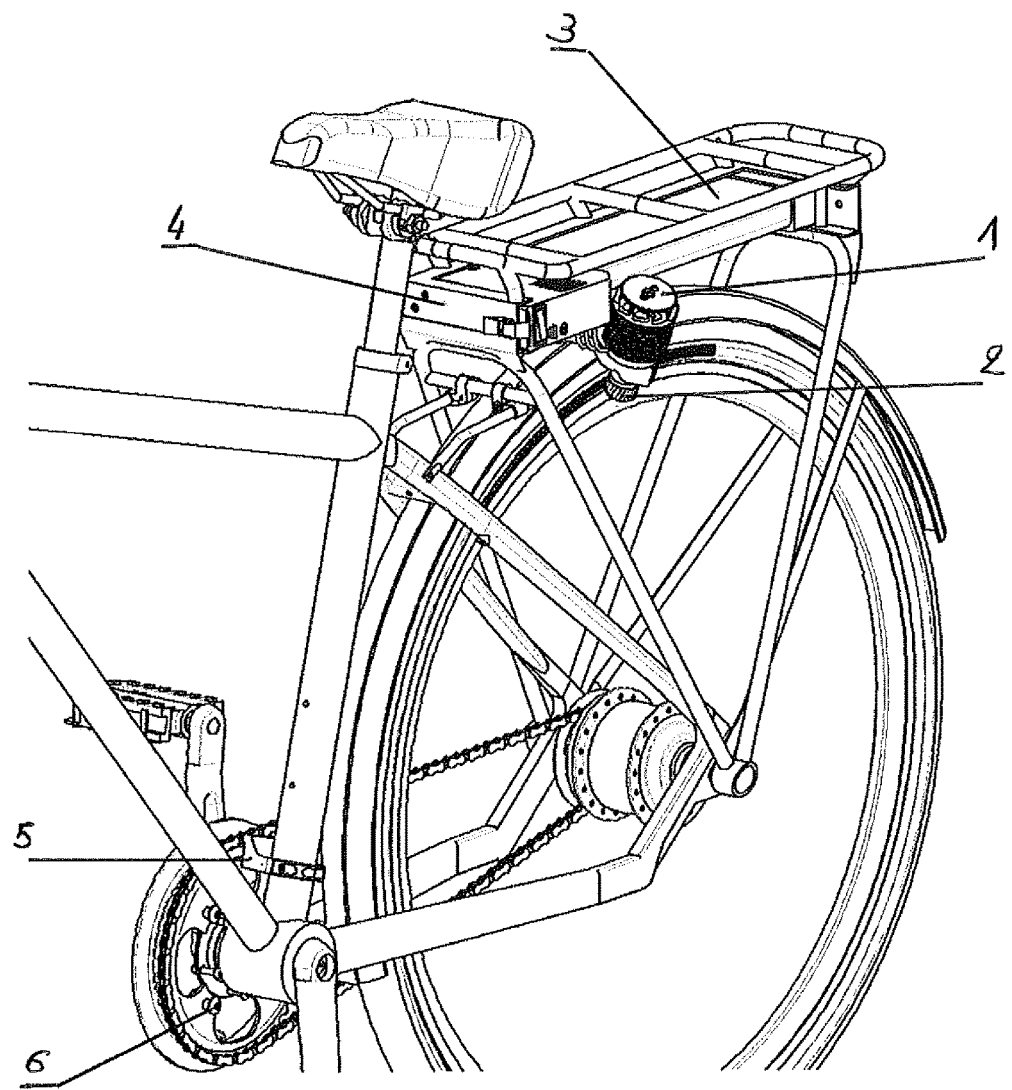

DEVICE AND METHOD FOR REGULATING THE ASSISTANCE POWER OF AN ELECTRIC POWER-ASSISTED BICYCLE

FIELD OF THE INVENTION

The present invention relates to electrical power assistance devices for a bicycle, and to bicycles fitted with such devices. In what follows, such bicycles will be referred to for convenience by the term "electrical bicycle".

RELATED ART

In this field, a number of devices available on the market are known. Some power assistance devices use an electrical machine placed in the hub of one of the wheels of the bicycle. This electrical machine drives the wheel directly or via a gear reduction system.

Other devices use a geared motor unit driving the pedals of the bicycle, and therefore using the existing transmission of the bicycle. Furthermore, application FR 12/61631 in the name of the Applicant describes a device comprising an electrical machine comprising a rotor driving a drive cog. The drive cog drives a wheel of the bicycle via a system for meshing the teeth of the cog with teeth integral with the tyre fitted to the wheel.

Whatever motorisation device is selected, it must be accompanied by a control system of the motor for regulating the assistance power provided to the cyclist.

French legislation stipulates a plurality of conditions for an electrically power-assisted bicycle to be classed in the "bicycle" rather than "moped" category, some of these conditions having a direct impact on the control of the motor:
- the motor must stop when the cyclist stops pedalling,
- the motor must stop when the speed reaches 25 km/h,
- the motor must have a maximum rated power of 250 watts, and
- the bicycle must not be fitted with an acceleration handle, switch, button or any other device allowing the bicycle to move on its own, except for an ON/OFF button.

A number of control devices satisfying these statutory conditions are known, in particular devices comprising a pedalling sensor fitted to the pedals, and a sensor for evaluating the torque exerted on the pedals at a given time. In these devices, the assistance power for the cyclist is determined by applying a fraction of the measured torque, or of the derived power, to the electric motor, this fraction being for example calculated as a function of the power assistance mode selected by the cyclist.

The drawback of these devices resides in the fitting of the torque sensor, which requires modification of the bicycle for integration thereof in the pedals.

The present invention therefore aims to provide a method and a device for regulating the assistance power for an electrical bicycle, making it possible to overcome the aforementioned drawbacks while complying with the statutory conditions.

BRIEF DESCRIPTION OF THE INVENTION

Thus, the present invention relates to a device for regulating the assistance power of a bicycle fitted with an electrical power assistance machine, the device comprising
- means for detecting the sense of rotation of the pedals of the bicycle,
- means for measuring the speed of a wheel of the bicycle,
- means for calculating a total power of the vehicle from the speed information, and
- means for determining a power setpoint of the electric motor from the calculated total power, the sense of rotation of the pedals and a power assistance factor selected by the cyclist.

In one particular embodiment, the device furthermore comprises means for determining the gradient of the road on which the bicycle is travelling, this gradient being used for the calculation of the power of the vehicle.

In one particular embodiment, the means for determining the gradient comprise an inertial platform comprising an accelerometer and a gyroscope.

In one particular embodiment, the device furthermore comprises a speed variator or a torque variator making it possible to control the electric motor as a function of the power setpoint which has been determined.

In one particular embodiment, the means for detecting the sense of rotation of the pedals of the bicycle comprise two magnetic sensors, for example Hall-effect sensors or magnetic switches, each of the sensors interacting with at least one magnet fitted to the chainset of the pedals.

In one particular embodiment, the means for measuring the speed of a wheel of the bicycle comprise a magnetic sensor, for example a magnetic switch, interacting with at least one magnet fitted to the wheel, for example on the rim, on a spoke or even on the tyre. Preferably, the magnetic sensor interacts with a plurality of magnets. This is because the greater the number of magnets is, the more rapidly the speed and acceleration of the wheel can be calculated.

In one particular embodiment, the device comprises a means for selection of a power assistance mode by the cyclist, and a means for transmitting this selection to the calculation means in the form of a power assistance factor.

Furthermore, the invention also relates to a method for regulating the assistance power of a bicycle fitted with an electrical power assistance machine, the method comprising the following steps:
- the sense of rotation of the pedals and a wheel speed are determined,
- a total power of the bicycle is calculated as a function of these data and a set of predetermined parameters,
- a power setpoint of the electrical power assistance machine is calculated as a function of the total power of the bicycle and of a predetermined power assistance factor.

In one embodiment, the method furthermore comprises the step of determining an angle of the vehicle, representing the gradient of the ground on which it is travelling.

BRIEF DESCRIPTION OF THE FIGURES

Other objects and advantages of the invention will become clear from the following description of a preferred but nonlimiting embodiment illustrated by FIG. 1, which represents a partial view of an electrically power-assisted bicycle fitted with a device according to the invention.

DESCRIPTION OF THE PREFERRED EMBODIMENT OF THE INVENTION

An electrical power assistance device for a bicycle generally comprises an electrical machine 1, means 2 for driving the bicycle using the electrical machine, a power source 3 for supplying the electrical machine, and means 4 for controlling the electrical machine. Various configurations are available, as described above, for all these elements. In this example, the power source 3 is in the form of a flat battery fitted under the luggage rack of the bicycle.

Present invention, as relates to a device for regulating the assistance power, is advantageously incorporated into the means for controlling the electrical machine. A particular embodiment of this invention will be described below without implying limitation.

The device for regulating the assistance power preferentially comprises a set of sensors: two sensors fitted to the pedals for determining that the pedals are being turned, and the sense of rotation; a speed sensor fitted to the wheel for determining the power of the wheel. It also comprises an inertial platform, the use of which will be described below, and a central electronic unit for carrying out all the calculations and algorithms described in the present application. In the example shown in FIG. 1, the inertial platform and the central electronic unit are fitted in the housing 4. They may be placed at other positions on the frame of the bicycle, and they are secured to this frame.

The sensors used are, for example, Hall-effect sensors. It is also possible to use sensors of the so called "reed" technology, also referred to as magnetic switches. To simplify reading, these sensors will be referred to as "reed sensors" in the rest of the description. Such a sensor consists of a magnetic contact 5 secured to the base element of the sensor and intended to interact with a magnet 6. When the magnetic contact and the magnet are in proximity to one another, they close the switch, the effect of which is to establish a current, which therefore makes it possible to determine the position of the magnet at this precise time. In the case of a Hall-effect sensor, these sensors being supplied with power, they directly provide digital information in the form of a "0" or a "1", corresponding to the absence or presence of a magnetic field created by the magnet in proximity to the magnetic contact. The magnetic sensor is connected to the central unit 4 in order to transmit the information coming from the detection.

In the present case, it is useful to provide two sensors of this type for the detection of pedalling. This is because although a single sensor would indeed make it possible to determine that the pedals are moving, it would not make it possible to detect the sense of rotation. However, a device according to the invention should preferably not provide assistance when the cyclist is back-pedalling.

Furthermore, still preferably, six magnets are distributed equally over the perimeter of the chainset. This makes it possible to ensure a fairly short detection time, since it avoids having to wait for a full revolution of the pedals before detecting that the pedalling has started.

The speed sensor (not represented here) of the wheel operates on the same principle, with preferably three magnets distributed equally over the perimeter of the rim of the wheel on which the detection system is fitted. Thus, the time between the passage of the contact in front of a first magnet and in front of the next magnet on the rim of the wheel is measured. Since the distance separating these two magnets is known information, it is then possible to determine the speed of the wheel.

In this particular embodiment, furthermore, the regulating device comprises an inertial platform, also referred to as an inertial unit, with six degrees of freedom. This platform is equipped with an accelerometer using three degrees of freedom and with a gyroscope using the other three. An inertial platform of this type makes it possible to determine the gradient of the road on which the bicycle is moving, in the form of an angle $\alpha$. The gradient of the road may be likened to the pitch of the bicycle. The inertial platform could also advantageously provide the roll angle of the bicycle, which makes it possible to represent the angle at which the cyclist is leaning. Such information, however, is not used in the present embodiment.

The inertial platform also makes it possible to determine an acceleration of the vehicle. It should be noted that this information is redundant, since the acceleration can be determined in this embodiment by differentiating the speed information given by the reed sensor described above.

In practice, the operation of the inertial platform differs from the ideal equations because of errors which affect the measurements of the rotations and the accelerations (bias, noise, scale factors, nonlinearities, etc.) and which generate drifts over the course of time in the estimations of attitude, the speed and the position.

In order to limit these drifts of the integrations in the processing of the acceleration and inertia information, the use of algorithms for hybridisation with sensors other than the sensors of the inertial platform is envisaged.

To that end, in a first preferred configuration, the use of an extended Kalman filter, which makes it possible to estimate the bias of the inertial platform from the speed information coming from the reed sensor, can be envisaged. Such a Kalman filter is well known to the person skilled in the art of signal processing, and will therefore not be described in detail here.

In another preferred configuration, the gradient of the road is, for its part, extracted from the acceleration and inertia information provided by the inertial unit, by using a direction cosine matrix (DCM).

This second preferred configuration is less complex and less resource-consuming for calculation than the Kalman filter. It has, however, been found that this method, although providing reliable results in the calculation of gradient with constant speed, induces errors when there are high accelerations or decelerations. In order to overcome this, in one embodiment, the speed and acceleration information calculated with the aid of the reed sensor are put back into the DCM equations.

Once all the pedalling, speed, acceleration and gradient information has been measured and/or calculated, it is then possible to determine the total power of the vehicle. To this end, equations of the kinematics of a body in accelerated movement are used, also referred to as UARM for uniformly accelerated rectilinear motion.

Thus, the total power of the vehicle is calculated in the form $$P_{total\ (t)} = P_{aerodynamic\ (t)} + P_{resistive\ (t)} + P_{acceleration\ (t)} \text{ with}$$

$$P_{aerodynamic\ (t)} = \frac{1}{2} * \rho * S * C_x * V_{(t)}^3$$

$$P_{resistive\ (t)} = \{M*[\sin(\alpha) + C_{RR} \cos(\alpha)]*g + F_{int}\} * V(t)$$

$$P_{acceleration\ (t)} = \frac{1}{2} * M * \alpha(t) * (V(t) + V(t-1)) \approx M * \alpha(t) * V(t)$$

$C_{RR}$ is the rolling friction coefficient of the surface on which the bicycle is running. It is, for example, equal to 0.0046 on tarmac. In one advantageous embodiment, this rolling friction coefficient is adapted as a function of the power assistance mode selected by the cyclist, for example a choice between "on-road" and "mountain bike", S is the estimated front surface area of the "bicycle+cyclist" combination. It is, for example, set at 0.5 m$^2$.

$C_x$ is the penetration coefficient in air, for example set at 1.2 for the calculation. $F_{int}$ is the internal force, representative of the friction of the rolling bearings of the bicycle, which may be neglected in the present case.

As regards the mass M, in one particular embodiment it is estimated at 15 kg for the bicycle and 70 kg for the cyclist, which gives a total mass of 85 kg. Nevertheless, it would be conceivable to allow the cyclist to input their own mass in order to refine the calculations. g and ρ are known data: g is the acceleration due to gravity and is equal to 9.81 m/s². ρ is the density of air at sea level and is equal to 1.225 kg/m³.

The other elements useful for the calculation of the total power are the variables determined by the various means described above, namely the speed of the vehicle the $$V(t) = \frac{\Delta x}{\Delta t},$$

acceleration of the vehicle (t)=Δv/Δt, and the angle of inclination of the vehicle, representing the gradient of the road, α.

Once this total power has been calculated, the central unit then determines the power setpoint of the electrical power assistance motor in the following way:

$$P_{setpoint\_motor(t)} = \frac{P_{total(t)}}{1 + \frac{1}{A}}$$

A is a positive numerical value representing the power assistance factor. This factor depends on the power assistance mode selected by the cyclist. Examples of a power assistance mode are for example "sport", "relaxed", "road", "mountain bike", etc.

The selection of the power assistance mode may be carried out by various means, for example by a potentiometer. Any other means for selecting the power assistance mode may be chosen, for example by means of an interface in the form of a touchscreen or alternatively by means of a telecommunication device which has a wireless link to the regulating device.

Furthermore, in one particular embodiment, the redundancy of the measurement of the acceleration of the vehicle, which was mentioned above, may be used in order to calibrate the offsets of the positioning of the inertial platform, by taking the acceleration from the measurement carried out on the road as a reference. This calibration should be carried out at a constant low speed.

It can thus be seen that the present invention makes it possible to provide an assistance power regulating device which complies with the statutory requirements, while avoiding the need to know the value of the torque exerted. The device described here has the advantage of not being too invasive in the bicycle. It is therefore possible to fit this device removably to any type of bicycle, without requiring any structural modification.

The invention claimed is:

1. A device for regulating an assistance power of a bicycle fitted with an electrical power assistance machine, the device comprising:
    a rotation-sense detector arranged to detect a sense of rotation of pedals of the bicycle;
    a speed sensor arranged to measure a speed of a wheel of the bicycle;
    a central electronic controller arranged to calculate a total power of the bicycle from the speed, and to determine a power setpoint of an electric motor from the total power, the sense of rotation of the pedals, and a power assistance factor selected by a cyclist of the bicycle, and
    a speed adjustor or a torque adjustor arranged to control the electric motor as a function of the power setpoint determined by the central electronic controller.

2. The device according to claim 1, further comprising a gradient sensor arranged to determine a gradient of a road on which the bicycle is travelling, the gradient being used to calculate the total power of the bicycle.

3. The device according to claim 1, wherein the gradient sensor includes an inertial platform equipped with an accelerometer and a gyroscope.

4. The device according to claim 1, wherein the rotation-sense detector includes two magnetic sensors, each of the two magnetic sensors being arranged to interact with at least one magnet fitted to a chainset of the pedals.

5. The device according to claim 1, wherein the speed sensor includes a magnetic sensor arranged to interact with at least one magnet fitted to the wheel.

6. The device according to claim 1, further comprising: a power selector arranged to enable the cyclist to select a power assistance mode; and a transmitter arranged to transmit the power assistance mode selected by the cyclist to the central electronic controller as the power assistance factor.

7. A method for regulating an assistance power of a bicycle fitted with an electrical power assistance machine, the method comprising:
    utilizing a rotation-sense detector of the electrical power assistance machine to detect a sense of rotation of pedals of the bicycle;
    utilizing a speed sensor of the electrical power assistance machine to measure a wheel speed of a wheel of the bicycle;
    utilizing a central electronic controller of the electrical power assistance machine to calculate a total power of the bicycle as a function of the sense of rotation, the wheel speed, and a set of predetermined parameters, and to determine a power setpoint of an electric motor of the electrical power assistance machine as a function of the total power of the bicycle, the sense of rotation of the pedals, and a predetermined power assistance factor selected by a cyclist of the bicycle, and
    utilizing a speed adjustor or a torque adjustor to control the electric motor as a function of the power setpoint determined by the central electronic controller.

8. The method according to claim 7, further comprising determining an angle of the bicycle, the angle representing a gradient of a ground surface on which the bicycle is travelling.

* * * * *

UNITED STATES PATENT AND TRADEMARK OFFICE
CERTIFICATE OF CORRECTION

PATENT NO. : 9,896,154 B2
APPLICATION NO. : 14/908581
DATED : February 20, 2018
INVENTOR(S) : Ivan Modolo It is certified that error appears in the above-identified patent and that said Letters Patent is hereby corrected as shown below:

In the Specification

Column 4:

Line 48, "$P_{total}(t) = P_{aerodynamic}(t) + P_{resistive}(t) + P_{acceleration(t)}$ with"

should read --$P_{total(t)} = P_{aerodynamic(t)} + P_{resistive(t)} + P_{acceleration(t)}$ with--.

Column 5:
Line 10, "vehicle the" should read --vehicle--.
Line 16, "acceleration" should read --the acceleration--.

In the Claims

Column 6:
Line 28, "comprising: a" should read --comprising:
 a--.
Line 30, "and a" should read --and
 a--.

Signed and Sealed this
Seventeenth Day of April, 2018

Andrei Iancu
*Director of the United States Patent and Trademark Office*